United States Patent
Naaman et al.

(10) Patent No.: US 9,455,913 B2
(45) Date of Patent: Sep. 27, 2016

(54) MANAGEMENT OF TRAFFIC BUFFERING IN INTERNAL AND EXTERNAL MEMORIES IN A PASSIVE OPTICAL NETWORK

(71) Applicant: Broadcom Corporation, Irvine, CA (US)

(72) Inventors: Ifat Naaman, Hod Hasharon (IL); Hilla Ben Yaacov, Bat Yam (IL); Ariel Lior, Holon (IL); Daniel Pasternak, Modiin (IL)

(73) Assignee: Broadcom Corporation, Irvine, CA (US)

( * ) Notice: Subject to any disclaimer, the term of this patent is extended or adjusted under 35 U.S.C. 154(b) by 495 days.

(21) Appl. No.: 13/768,250

(22) Filed: Feb. 15, 2013

(65) Prior Publication Data

US 2014/0233383 A1  Aug. 21, 2014

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/801* | (2013.01) |

(52) U.S. Cl.
CPC ..................... *H04L 47/10* (2013.01)

(58) Field of Classification Search
USPC ........................................................ 370/235
See application file for complete search history.

(56) References Cited

U.S. PATENT DOCUMENTS

| | | | | |
|---|---|---|---|---|
| 6,618,390 B1* | 9/2003 | Erimli | ..................... | H04L 49/90 370/395.7 |
| 6,715,039 B1* | 3/2004 | Michael et al. | .............. | 711/133 |
| 6,977,940 B1* | 12/2005 | Ahlfors | ............... | H04L 12/5601 370/412 |
| 7,027,437 B1* | 4/2006 | Merchant | ................ | H04L 43/12 370/389 |
| 8,810,589 B1* | 8/2014 | Khoury et al. | ................ | 345/537 |
| 2002/0176430 A1* | 11/2002 | Sangha | .................. | H04L 49/90 370/412 |
| 2003/0223447 A1* | 12/2003 | Saxena et al. | ................ | 370/428 |
| 2004/0141759 A1* | 7/2004 | Stiscia | .................. | H04J 3/1682 398/168 |
| 2005/0147038 A1* | 7/2005 | Chandra | ............... | G06F 13/128 370/235 |
| 2007/0070997 A1* | 3/2007 | Weitz | ...................... | H04L 49/90 370/389 |
| 2007/0074218 A1* | 3/2007 | Levy | ....................... | H04L 49/90 718/102 |
| 2008/0175559 A1* | 7/2008 | Jung et al. | ...................... | 386/68 |
| 2008/0247409 A1* | 10/2008 | Choudhury | ............. | H04L 49/90 370/412 |
| 2012/0198159 A1* | 8/2012 | Fujikawa | ............ | G06F 11/3409 711/118 |

* cited by examiner

*Primary Examiner* — Faruk Hamza
*Assistant Examiner* — Shah R Zaman
(74) *Attorney, Agent, or Firm* — Sterne, Kessler, Goldstein & Fox P.L.L.C.

(57) ABSTRACT

Methods, systems, and computer program products for managing memory of a passive optical network (PON) are provided herein. The method includes the steps of receiving a plurality of data packets from a stream of packets. A plurality of packet descriptors associated with each data packet is stored in a configurable first queue. The first queue includes a plurality of cache slots and is managed in an internal memory. A state of the first queue is identified. In response to the state of the first queue meeting a predetermined threshold, packet descriptors from a tail cache slot of the first queue are transferred to a second queue. The second queue is managed in an external memory.

20 Claims, 7 Drawing Sheets

MANAGEMENT OF TRAFFIC BUFFERING IN INTERNAL AND EXTERNAL MEMORIES IN A PASSIVE OPTICAL NETWORK

TECHNICAL FIELD

The embodiments presented herein generally relate to memory management in a passive optical network environment.

BACKGROUND ART

In order to keep pace with increasing Internet traffic, network operators have widely deployed optical fibers and optical transmission equipment, substantially increasing the capacity of backbone networks. A corresponding increase in access network capacity is also needed to meet the increasing bandwidth demand of end users for triple play services, including Internet protocol (IP) video, high-speed data, and packet voice. Even with broadband solutions, such as digital subscriber line (DSL) and cable modem (CM), the limited bandwidth offered by current access networks still presents a severe bottleneck in delivering large bandwidth to end users. Among different competing technologies, passive optical networks (PONs) are one of the best candidates for next-generation access networks. With the large bandwidth of optical fibers, PONs can accommodate broadband voice, data, and video traffic simultaneously. Furthermore, PONs can be built with existing protocols, such as Ethernet and ATM, which facilitate interoperability between PONs and other network equipment.

As the demand from users for bandwidth is rapidly increasing, optical transmission systems, where subscriber traffic is transmitted using optical networks, is installed to serve this demand. These networks are typically referred to as fiber-to the-curb (FTTC), fiber-to-the building (FTTB), fiber-to-the premise (FTTP), or fiber-to-the-home (FTTH). Each such network provides access from a central office (CO) to a building, or a home, via optical fibers installed near or up to the subscribers' locations. As the transmission bandwidth of such an optical cable is much greater than the bandwidth actually required by each subscriber, a Passive Optical Network (PON), shared between a plurality of subscribers through a splitter, was developed.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers. Note that other topologies are also possible, including ring and mesh topologies. Transmissions within a PON are typically performed between an optical line terminal (OLT) and optical network units (ONUs). The OLT controls channel connection, management, and maintenance, and generally resides in the central office. The OLT provides an interface between the PON and a metro backbone, which can be an external network belonging to, for example, an Internet service provider (ISP) or a local exchange carrier. The ONU terminates the PON and presents the native service interfaces to the end users, and can reside in the customer premise and couples to the customer's network through a customer-premises equipment (CPE).

As used herein, the term "downstream" refers to the transfer of information in a direction from an OLT to an ONU. The term "upstream" refers to the transfer of information in a direction from an ONU to an OLT. During the transfer of data within a PON, data packets are queued in memory. In general, data packets are managed in an internal memory of the OLT. The OLT is responsible for the transmission of data packets both upstream and downstream. Due to the volume of data packets in such systems, an external memory is used in a management scheme to store packet descriptors associated with the data packets. Such a management scheme is often affected by the latency involved in reading and writing data to the external memory. Such latency can result in the dropping of packets when a transmission time is missed due to a delay. Therefore, a management scheme is needed within a PON, that avoids such problems.

BRIEF SUMMARY

Described herein are system, method, and computer program product embodiments, and combinations and sub-combinations thereof, for management of traffic buffering in a passive optical network (PON). In embodiments, memory management includes receiving a plurality of data packets from a stream of packets. A plurality of packet descriptors associated with each data packet are stored in a configurable first queue. The first queue includes a plurality of cache slots and is managed in an internal memory. A state of the first queue is identified. In response to the state of the first queue meeting a predetermined threshold, packet descriptors from a tail cache slot of the first queue are transferred to a second queue. The second queue is managed in an external memory.

Further embodiments, features, and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are included to provide a further understanding of embodiments of the present disclosure and are incorporated in and constitute a part of this specification, illustrate embodiments of the present disclosure and together with the description serve to explain the principles of the present disclosure. In the drawings.

The present disclosure will now be described with reference to the accompanying drawings. In the drawings, like reference numbers may indicate identical or functionally similar elements.

DETAILED DESCRIPTION OF THE INVENTION

While the present disclosure is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

Figure 1:
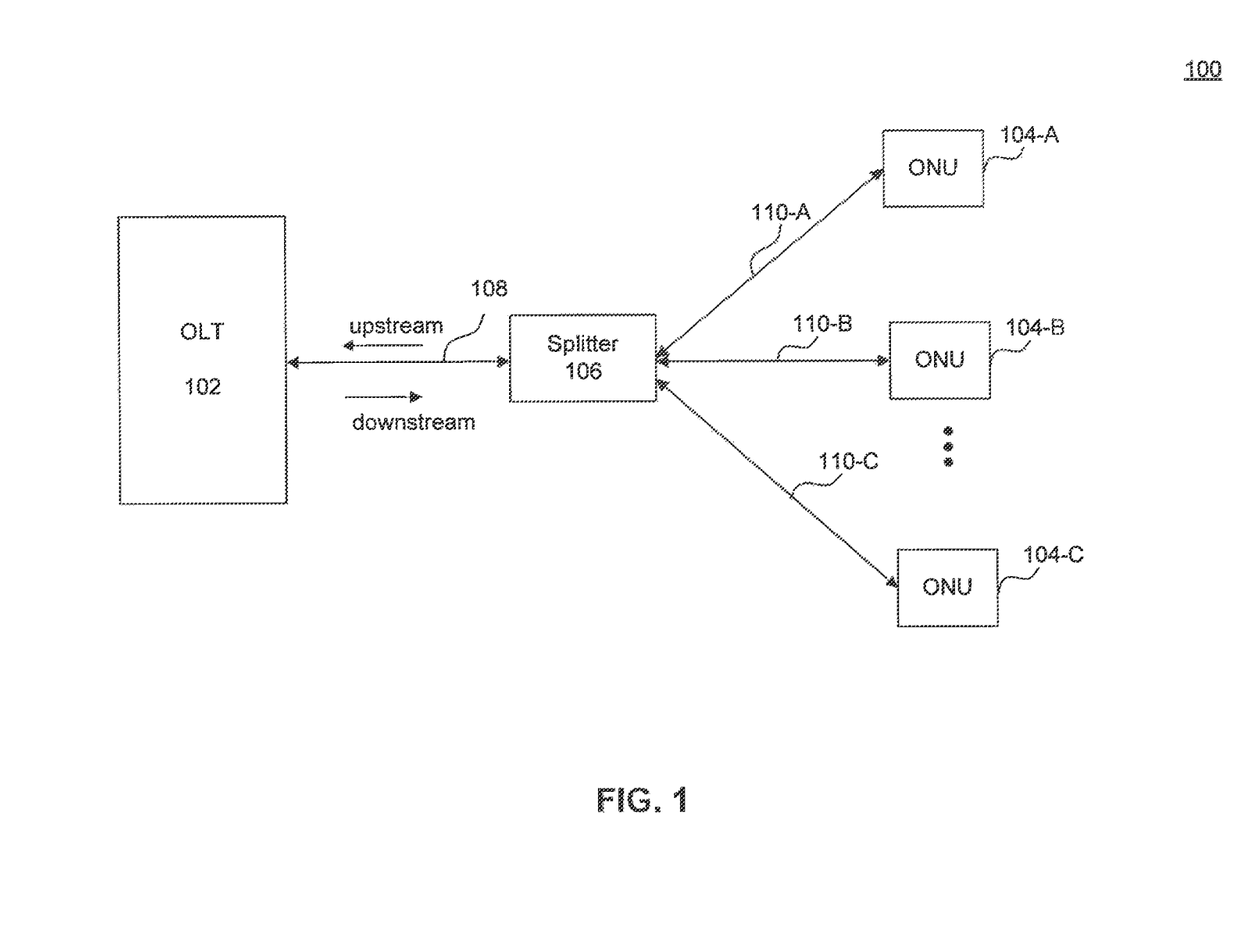
FIG. 1 illustrates an example Passive Optical Network (PON) system.

FIG. 1 illustrates an exemplary PON system 100. PON system 100 includes optical network units (ONUs) 104-A, 104-B, 104-C, which are communicatively coupled to optical line terminal (OLT) 102 via a passive optical splitter 106 and optical paths 108 and 110. A single optical path 108 runs from OLT 102 to optical splitter 106, which is located near the location of a user. Optical splitter 106 is passive because it does not require any power to operate. Optical splitter 106 divides the optical power into a plurality of optical paths 110-A, 110-B, and 110-C to the users. The optical paths 110 can vary, for example, between 2 and 128. From the optical splitter 106 a single mode (SM) fiber strand is run to each user as optical path 110. Traffic data transmission is achieved by using two optical wavelengths, one for the downstream direction and another for the upstream direction. Downstream transmission of data from OLT 102 is broadcast to all ONUs 104 and encryption is used to prevent eavesdropping. Each ONU 104 filters its respective data according to, for example, pre-assigned labels. ONUs 104 transmit respective data upstream to OLT 102 during different time slots allocated by OLT 102 for each ONU 104. For example, transmission of data upstream can be performed using a Time Division Multiple Access (TDMA) scheme. TDMA is a channel access method for shared networks. It allows several users to share the same frequency channel by dividing the signal into different time slots. Thus, ONUs 104 can transmit data in rapid succession, one after the other, each using its own time slot. This allows multiple ONUs 104 to share the same transmission medium (e.g. radio frequency channel) while using only a part of its channel capacity.

Gigabit PON (UPON) is an emerging standard currently being adopted by many telecommunication companies in order to deliver high-speed data services to their subscribers. These services typically include a bundle of TV broadcasting, Internet, and telephone services. To provide these services, an ONU 104 is connected to a residential gateway (not illustrated) installed in the premises. An input of the residential gateway is connected to the ONU 104. The gateways are coupled to, for example, a telephone device, a TV set-top box, or, a computer to provide Internet connectivity. Generally, a residential gateway may provide the functionality of a modem and router and may be, for example, a cable modem, a router, a switch, a wireless modem, a wireless router, etc. Although FIG. 1 illustrates a tree topology, a PON can also be based on other topologies, such as a logical ring or a logical bus. Note that, although in this disclosure many examples are based on GPONs, embodiments of the present disclosure are not limited to GPONs and can be applied to a variety of PONs, such as, but not limited to, xGPON, ATMPONs (APONs), ethernet PONs (EPONs), and wavelength division multiplexing (WDM) PONs.

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 2:
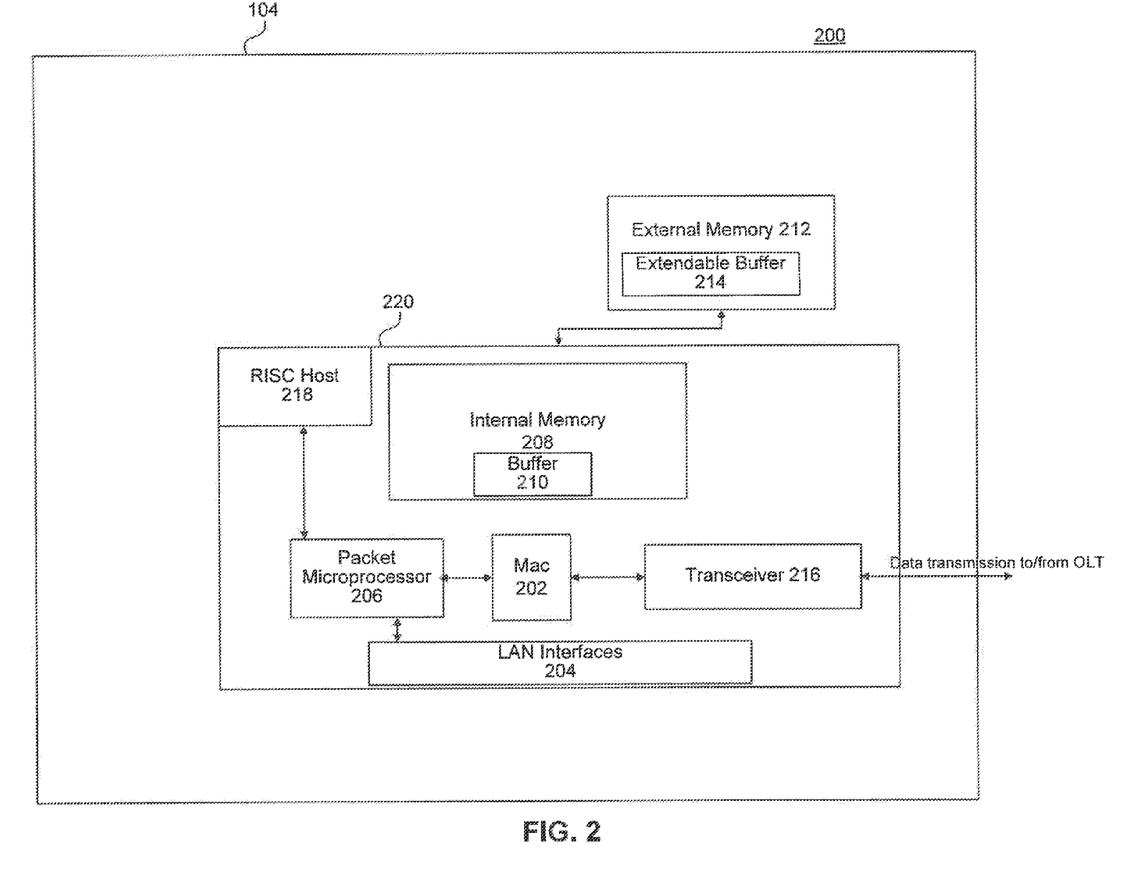
FIG. 2 illustrates an Optical Network Unit according to an embodiment.

FIG. 2 illustrates an embodiment of an Optical Network Unit (ONU) 200. ONU 200, which corresponds to ONU 104 described above in connection with FIG. 1, includes a chip 220. Chip 220 allows software and data to be transferred between ONU 104 and external devices. Examples of chip 220 may include a modem, a network interface (such as an Ethernet card), a communications port, a PCMCIA slot and card, etc. Software and data transferred via chip 220 are in the form of signals which may be electronic, electromagnetic, optical or other signals capable of being received by chip 220. Chip 220 includes media access control (MAC) module 202, LAN interfaces 204, packet microprocessor 206, internal memory 208, transceiver 216, and Reduced Instruction Set Computing (RISC) host 218. Packet microprocessor 206 is connected to a communication infrastructure (not illustrated), (for example, a bus or network). Various software implementations are described in terms of this exemplary computer system. After reading this description, it will become apparent to a person skilled in the relevant art how to implement the disclosure using other computer systems and/or computer architectures.

The terms "computer program medium" and "computer usable medium" are used herein to generally refer to media such as media within RISC host 218 packet microprocessor. These computer program products are means for providing software to be used by ONU 104.

Transceiver 216 can include a transmitter and/or a receiver used for the transmission or receipt of data packets. Internal memory 208 includes a buffer 210. Internal memory 208 may be a SRAM. However, any type of memory is contemplated as within the scope of this disclosure. Chip 220 is communicatively coupled to external memory 212. External memory 212 includes extendable buffer 214. MAC module 202 interfaces with an upstream OLT 102 through transceiver 216. MAC module 202 transmits data traffic to OLTs. According to an embodiment, MAC module 202 can operate at a dual data rate. According to an embodiment, packet microprocessor 206 can perform downstream and upstream traffic control. Packet microprocessor 206 is configured to perform forwarding-table lookup functionalities such as determining the corresponding GPON Encapsulation Method ID (GEM ID) in the upstream direction or virtual local area network (VLAN) ID in the upstream or downstream direction for a received data packet.

Buffer 210 can include a number of queues corresponding to different traffic priorities. In general, these queues function as First in First Out (FIFO) queues. A received data packet can be stored in a corresponding queue based on the lookup result. For example, in the downstream direction separate FIFO queues per service can be maintained for unicast traffic, multicast traffic, and broadcast traffic services. MAC module 202 has configurable options and is coupled a number of interfaces, including but not limited to Gigabit Media Independent Interface (GMII). RISC host 218 can include an embedded microprocessor that enables management and control of a PON. External memory 212, such as, but not limited to, double data rate synchronous dynamic random access memory (DDR SDRAM) can be used to support packet buffering and PON management, according to an embodiment. As will be appreciated, the external memory 212 includes a computer usable storage medium having stored therein computer software and/or data.

In an embodiment, transceiver 216 is configured to receive a plurality of data packets from a stream of packets. The plurality of data packets can include upstream or downstream packets corresponding to video, voice, data and/or control messages. LAN interface 204 is the customer facing or customer equipment facing interfaces of ONU 104. Each data packet is associated with a traffic class type. A traffic class type for a data packet is determined based on bandwidth requirements and priority of the data packet, according to an embodiment. Within a GPON, data packets may be transmitted based on different traffic class types. For example, a type 1 traffic class can include data packets that require a fixed bandwidth and are used for messages sensitive to delay and high priority, such as Voice-Over-Internet Protocol (VOIP) data. A type 2 and type 3 traffic class can include data packets associated with video and data services of high priority and with predetermined bandwidth requirements. A type 4 traffic class can include data packets for data services such as the Internet and services of low priority, which do not require a high bandwidth. A type 5 traffic class can include data packets of a variety of services and varying bandwidth requirements.

Each data packet received by transceiver 216 is associated with a packet descriptor, according to an embodiment. Each data packet is allocated in a buffer of external memory 212, while the associated packet descriptor represents its respective data packet and is allocated at an egress(outgoing) queue of internal memory 208. Prior to transmission of a data packet, a packet descriptor is assigned to the data packet. The packet descriptor can include information such as the type of the packet, message source and message destination. The packet descriptor also includes a pointer to the associated data packet, according to an embodiment. Upon receipt of the data packet, packet microprocessor 206 is configured to store the associated packet descriptor in a queue of buffer 210 managed by internal memory 208.

Packet descriptors are stored and managed in a queue of buffer 210 as groups of packets descriptors. As discussed previously, buffer 210 can include a plurality of queues which are designated for storage of different types of data packets. Thus, buffer 210 can include queues designated for upstream and downstream data in addition to queues designated for data of a particular traffic class type. The queues of buffer 210 can include a plurality of cache slots. According to an embodiment, a cache slot is part of the logic of extending descriptor queues to external memory in order to enable a larger number of descriptors and hence large packet buffering capabilities (packet data is also located in external memory). Cache slots are used because access to external memory is more efficient (i.e. memory bandwidth utilization) when accessing data in large chunks. A cache slot can store a predetermined group of packet descriptors. For example, a queue can be configured to store packet descriptors in 32 byte chunks. In such an instance, 4 packets descriptors, each of 8 bytes can be stored in a cache slot of a queue.

According to an embodiment, the number of cache slots is adjustable. For example, the number of cache slots of a queue of buffer 210 can be adjusted based a latency of read and write operations to external memory 212. External memory latency is defined as the duration of time between initiating a read or write request and the point in time when the request is completed. External memory latency affects the amount of queue entries that need to be buffered in internal memory 208 while a read or write request operation is performed on external memory 212. Thus, an internal memory 208 of sufficient size is needed to prevent any delay or stalls resulting from external memory latency. As discussed previously, each cache slot of a queue can include available storage space to group up to four packet descriptors at a time. In another embodiment, transmission of data traffic that is not buffered (e.g. does not require use of external memory) can be sustained by the system. The internal memory 208 can be sufficient for storing the data traffic and this enables higher sustained traffic rates, since access to external memory is not needed and thus access time and latency is saved.

Packet microprocessor 206 is configured to monitor a state of a queue of buffer 210, according to an embodiment. In an embodiment, a queue of buffer 210 can include two states: state 0 and state 1. During state 0, a queue of buffer 210 is configured to operate as a FIFO queue. Thus, data packets are enqueued and dequeued based on the order the data packets are stored in the queue. During state 1, a queue of buffer 210 is used in conjunction with a queue of external buffer 214 to manage data packet transmission. According to an embodiment, a queue of buffer 210 is changed from a state 0 to state 1 based on the queue meeting a predetermined threshold. For example, a predetermined threshold can be based on the size of the queue of buffer 210. Thus, packet processor 206 monitors the size of the queues of buffer 210 and available cache slots. A queue of buffer 210 is determined to be at capacity (e.g. full), when all cache slots of the first queue include at least one packet descriptor. When this occurs, the contents of a tail cache slot of the queue of buffer 210 are transferred and written to a queue of external buffer 214. A pointer is maintained from the tail cache slot of the queue of buffer 210 to the queue of external buffer 214. Thus, while in state 1, the tail cache slot of the queue of buffer 210 always points to the queue of external buffer 214. In addition, while the queue of buffer 210 is state 1 and upon receipt of additional data packets and associated packet descriptors, the additional packet descriptors are stored in the queue of external buffer 214.

According to an embodiment, a packet descriptor can be dequeued from the queue of buffer 210. When a packet descriptor is dequeued from the queue of buffer 210, the dequeued packet descriptor and its associated data packet are transmitted to a destination source of the PON based on a type of the data packet. The type of the data packet corresponds to the traffic class types discussed previously. In response to the dequeuing of the packet descriptor from the queue of buffer 210, a cache slot including at least one of the additional packet descriptors stored in the queue of the external buffer 214 is transferred to the queue of buffer 210, according to an embodiment. Thus, the queue of buffer 210 is configured to read additional packet descriptors from the queue of external buffer 214. When a packet descriptor is transferred to the queue of buffer 210, the corresponding cache slot of the queue of buffer 210 includes a head pointer. The corresponding cache slot is subsequently managed as a head cache slot for dequeueing purposes. Thus, for each cache slot of packet descriptors transferred to the queue of buffer 210, a head pointer is incremented and in this way the queue of buffer 210 can include multiple "head cache slots" while the queue of buffer 210 is in state 1. In an embodiment, the exchange of data between the queue of buffer 210 and the queue of external buffer 214 is monitored in order to determine when the state of the queue of buffer 210 should be changed. When all additional packet descriptors of the queue of external buffer 214 are transferred to the queue of buffer 210 and all packet descriptors of the cache slots of the queue of buffer 210 have been dequeued, the state of the queue of buffer 210 is returned to 0, according to an embodiment.

Figure 3A:
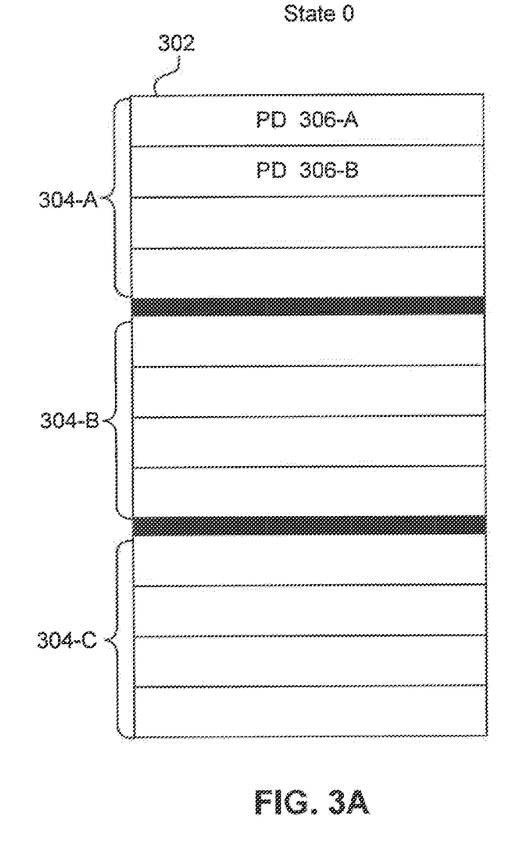
FIGS. 3A-3E illustrate the management of data packets, according to an embodiment.
Figure 3B:
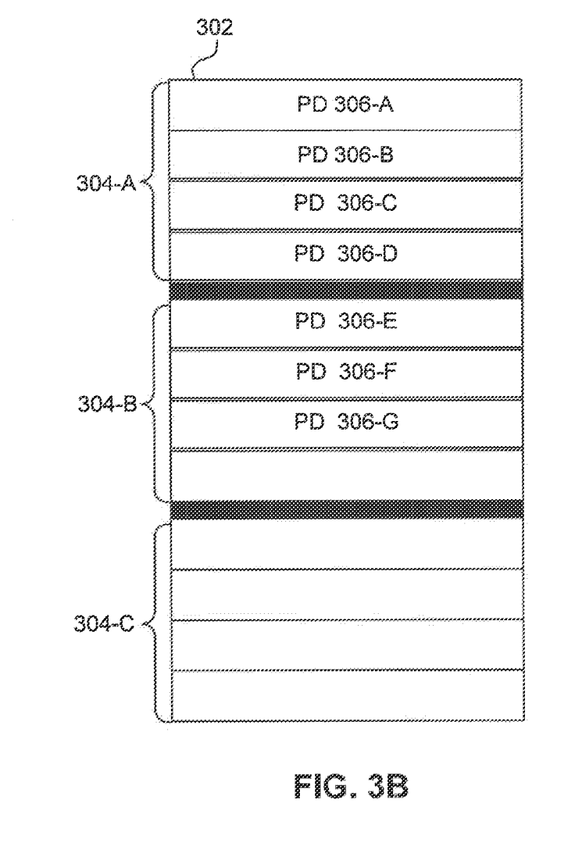

FIGS. 3A-3E illustrate the management of data packets, according to embodiments. FIGS. 3A and 3B illustrate a queue 302 during a state 0. Queue 302 resides in internal memory of an ONU, for example. Queue 302 illustrates a cache with three cache slots 304-A, 304-B, 304-C. Each cache slot 304 has a storage capacity to store up to four packet descriptors. Thus each cache slot 304 can include 4 entries of packet descriptors with each packet descriptor being a size of 8 bytes, for example. While FIG. 3A illustrates queue 302 with three cache slots and each cache slot storing up to 32 bytes of data, it is understood that queue 302 can be configured to include any number of cache slots which can store varying numbers of packet descriptors. As illustrated in FIG. 3A, packet descriptors 306-A and 306-B are stored in cache slot 304-A. Packet descriptors 306-A and 306-B are stored in cache slot 304-A based on the queued order. Thus, packet descriptor 306-A is at the head of queue 302 and will be serviced and transmitted prior to packet descriptor 306-B, which is at the tail of queue 302. Packet descriptors 306-A and 306-B can correspond to data packets received by an ONU.

FIG. 3B illustrates queue 302 with additional stored packet descriptors. Packet descriptors 306-C and 306-D are enqueued in cache slot 304-A and packet descriptors 306-E, 306-F, and 306-G are enqueued in cache slot 304-B As discussed previously, queue 302 of FIGS. 3A and 3B is managed during a state 0 of queue 302. During state 0, cache slots 304 are managed in FIFO manner. Thus, in FIG. 3A, cache slot 304-A includes a head pointer or "head cache slot" and a tail pointer or "tail cache slot" of queue 210. Since FIG. 3A only includes two packets descriptors 306-A and 306-B, the head pointer is at the beginning of the cache slot 304-A, while the tail pointer is located right after packet descriptor 306-B, as in a standard FIFO queue. In FIG. 3B, as additional packet descriptors 306-C through 306-G are stored in queue 302, the head pointer and tail pointer are repositioned. As illustrated by FIGS. 3A and 3B, during state 0, there is no read/write access needed to external memory and this results in an efficient system because external memory bandwidth and external memory access latency are not factors.

Figure 3C:
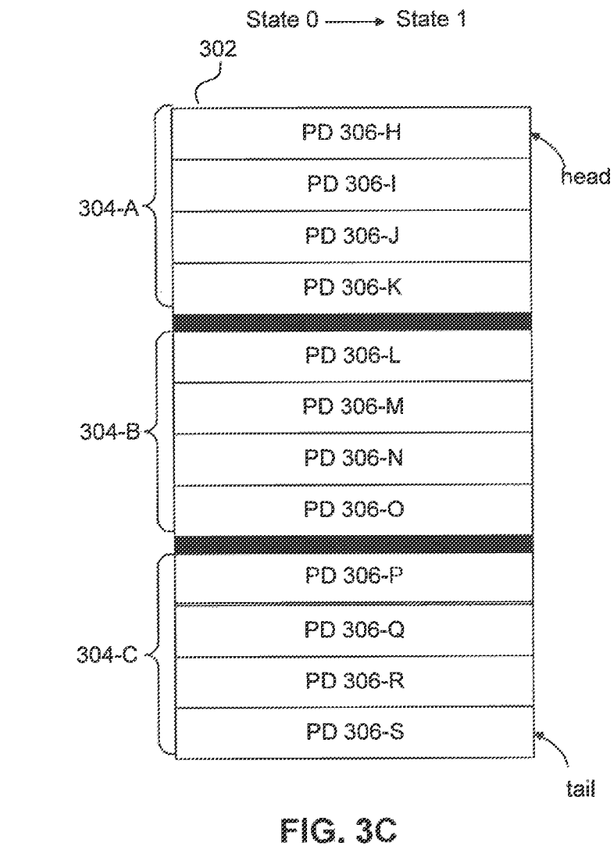
Figure 3D:
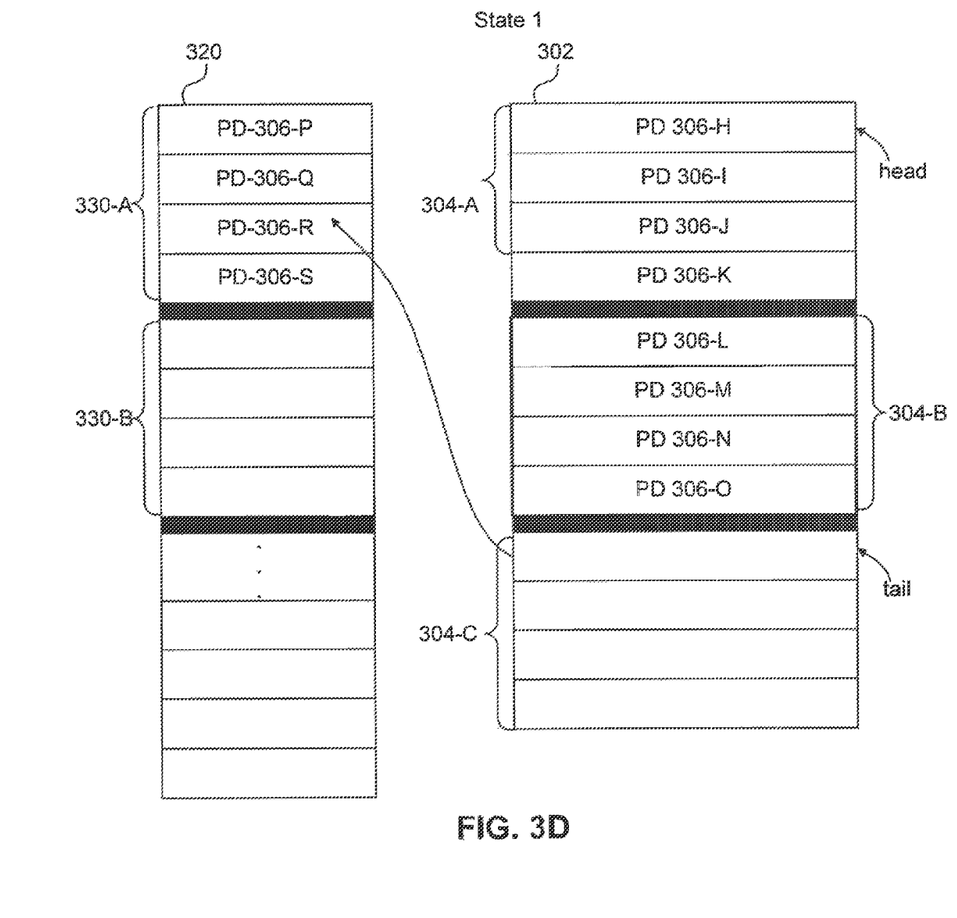

FIG. 3C illustrates a transition of queue 302 from state 0 to state 1. As illustrated in FIG. 3C, all cache slots 304 are full. Cache slot 304-A includes packet descriptors 306-H, 306-I, 306-J, and 306-K. Cache slot 304-B includes packet descriptors 306-L, 306-M, 306-N, 306-O. Cache slot 304-C includes packet descriptors 306-P, 306-Q, 306-R and 306-S. Since packet descriptors 306 are stored in groups of four, in this example, it is possible for a cache slot 304 to be partially empty. When all cache slots 304 of queue 302 are full, the tail pointer cannot be incremented and it serves an indicator of a change in state of queue 302. Queue 302 is transitioned from state 0 to state 1 when this condition is met. In state 1, an external queue managed by an external memory is used to manage the packet descriptors 306. FIG. 3D illustrates the use of an external queue 320 to manage packet descriptors 306. Since queue 302 is full, tail cache slot 304-C is written to cache slot 330-A of external queue 320. As a result, cache slot 330-A of external queue 320 includes packet descriptors 306-P, 306-Q, 306-R, and 306-S. During state 1, the tail cache slot 304-C of queue 302 is kept empty and used to receive additional packet descriptors and subsequently write the additional packet descriptors to a cache slot of external queue 320. Thus, the previous tail pointer of queue 302 now starts from the beginning of cache slot 330-A and external queue 320 operates as a small tail FIFO queue of 1 cache slot.

Figure 3E:
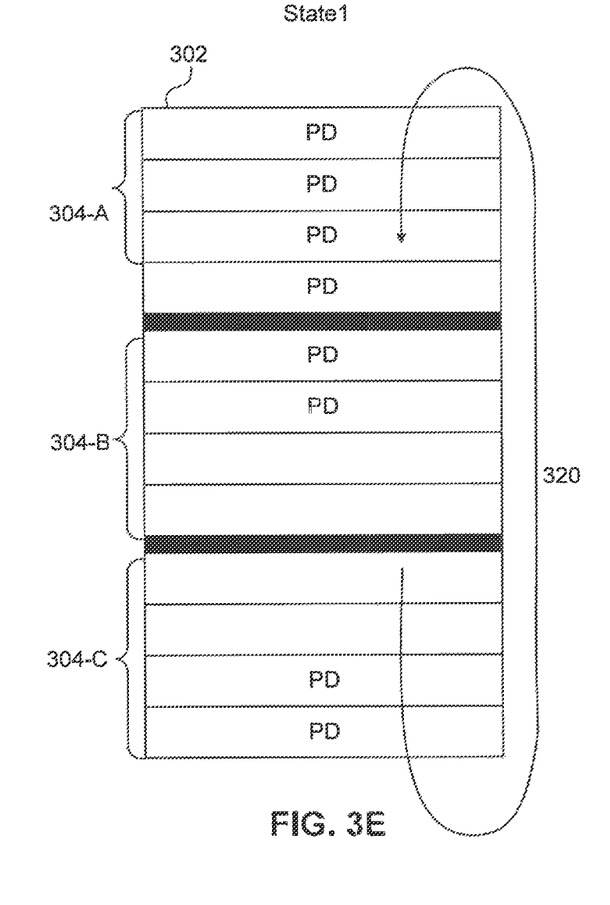

FIG. 3E illustrates the management of queue 302 while in state 1. While in state 1, the head pointer 320 of queue 302 wraps around the queue 302 and performs read operations from external queue 320 of FIG. 3D for additional packet descriptors 306. Therefore, cache slots 304-A and 304-B are filled with data from external queue 320. However, tail cache slot 304-C is always skipped, since it is used to receive additional packet descriptors and subsequently write the additional packet descriptors to a cache slot of external queue 320. Accordingly, in state 1, tail cache slots are written to external memory and head cache slots are read from external memory. During state 1, queue 302 includes a single "tail slot" and several "head slots" and this eliminates external memory latency impact. When the external memory queue is empty, and all "head slots" of queue 302 are empty the head pointer is updated to point to the beginning of the tail cache slot, and queue 302 is returned to state 0.

Figure 4:
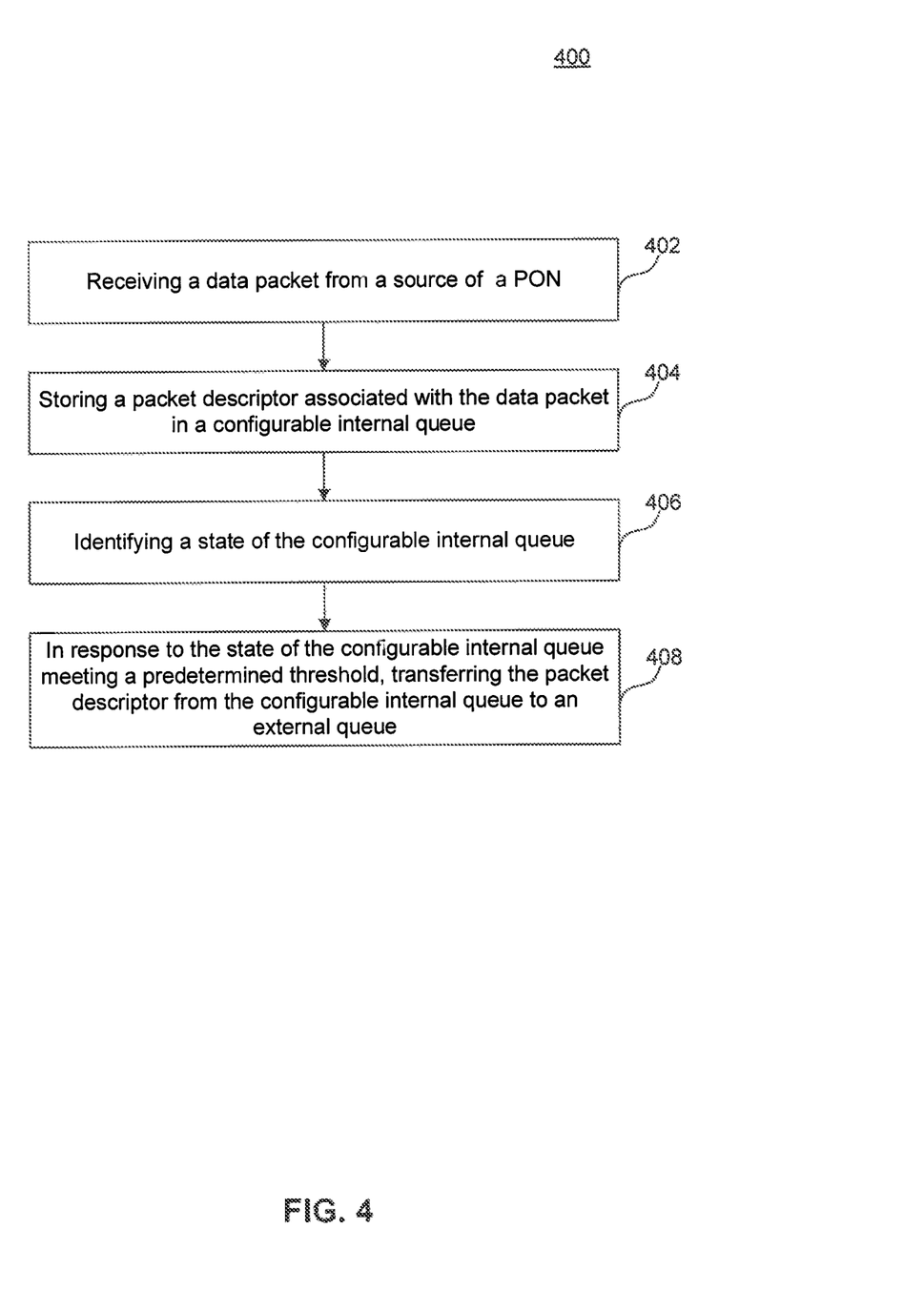
FIG. 4 is an example flowchart illustrating a process by which an ONU manages traffic buffering in a PON, according to an embodiment.

FIG. 4 illustrates an example flowchart 400 for managing memory of a passive optical network (PON), according to an embodiment. Flowchart 400 will be described with reference to the example operating environment depicted in FIG. 1 and FIG. 2. However, the process is not limited to these embodiments. Note that some operations shown in process 400 do not necessarily have to occur in the order shown.

In operation 402, a plurality of data packets of a stream of packets is received. For example, a plurality of data packets can be received by transceiver 216 of ONU 104. The source of the plurality of data packets may be downstream or upstream within the PON or from a LAN interface. The plurality of data packets can include video, voice, data, and/or control messages.

In operation 404, a plurality of packet descriptors associated with each data packet is stored in a configurable first queue. For example, packet descriptors may be stored in a queue of buffer 210 managed by internal memory 208. Each data packet is associated with a packet descriptor which can include information related to the data packet such as a message type, source, and destination. Packet descriptors can be stored in a configurable first queue managed by internal memory. Packet descriptors also include a pointer to the corresponding data packet. According to an embodiment, packet descriptors are stored and managed in groups. For example, the first queue can be configured to include a plurality of cache slots. Each cache slot can store an amount of data (e.g., up to 32 bytes of data in some embodiments). Thus, a cache slot can store up to four packet descriptors, each of size 8 bytes. The size of the first queue (e.g. number of cache slots) can be adjusted based on a number of factors, such as user preference or an external memory access latency, for example.

In operation 406, a state of the first queue is identified. For example, step 406 may be performed by packet microprocessor 206 of ONU 104. According to an embodiment, the first queue has two states. During a first state, state 0, the queue is managed as a standard FIFO queue and packet descriptors are enqueued and dequeued based on the order they are stored in the first queue. During a second state, state 1, an extendable second queue managed by external memory is used to manage the packet descriptors.

In operation 408, in response to the state of the first queue meeting a predetermined threshold, packet descriptors from a tail cache slot of the first queue are transferred to a second queue. For example, packet descriptors can be transferred from a first queue of buffer 210 to a second queue of external buffer 214 when packet processor 206 determines that the state of the first queue meets a predetermined threshold. The state of the first queue is monitored to determine when it has reached capacity or it is full. Thus, when packet descriptors are stored in all cache slots of the first queue, this is in indicator to change the state of the queue from state 0 to state 1. In state 1, packet descriptors of the last cache slot used as tail of the first queue are written to the first cache slot of the second queue managed by external memory. During state 1, the tail cache slot including the tail pointer is kept empty and used to receive additional packet descriptors and subsequently write the additional packet descriptors to the second queue. The head pointer of the first queue wraps around the queue and reads additional packet descriptors from the second queue. Thus, in state 1, the first queue includes a single "tail slot" and several "head slots" (number of head slots is equal to the number of SRAM queue cache slots minus 1). This is due to the fact that the external memory read latency is much larger than the external memory write latency.

In this way, method 400 enables two modes of operations of a queue stored in internal memory of an ONU. The two modes of operations and usage of an external queue when the internal queue is full enables optimization for high bandwidth and sustains data packets with short traffic transmission times or systems with short queues. Additionally, while in state 1, since the internal memory is used for reading a queue head prior to transmission of the data packets, while the majority of the packet-descriptors are stored in external memory, this results in a good utilization of the storage space provided by the internal memory. The internal memory space is dynamically used for head and tail cache slots and this enables sufficient usage of the allocated internal memory space. In an embodiment, the head of the queue is read back into internal memory for transmission.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A method for managing memory of a passive optical network (PON) comprising:
 receiving a plurality of data packets;
 storing a plurality of packet descriptors associated with each data packet in a configurable first queue, wherein the first queue includes a plurality of cache slots and is managed in an internal memory;
 adjusting a quantity of the plurality of cache slots based on read and write operations to an external memory;
 identifying a state of the first queue;
 in response to the state of the first queue meeting a predetermined threshold, transferring packet descriptors from a tail cache slot of the first queue to a second queue, wherein the second queue is managed in the external memory; and
 storing additional packet descriptors in the second queue while the state of the first queue meets the predetermined threshold;
 dequeueing a packet descriptor of the plurality of packet descriptors from the first queue;
 in response to the dequeuing of the packet descriptor, transferring content of a cache slot from among the plurality of cache slots from the second queue to the first queue, the content comprising at least one of the additional packet descriptors; and
 changing the state of the first queue when all additional packet descriptors of the second queue are transferred to the first queue and all cache slots of the first queue are available for storage.

2. The method of claim 1, wherein identifying the state of the first queue comprises:
 determining a size of the first queue, wherein the size is based on a number of cache slots available for storage;
 determining whether all cache slots of the first queue include at least one packet descriptor; and
 when all cache slots of the first queue include at least one packet descriptor, changing the state of the first queue.

3. The method of claim 2, wherein the quantity of the plurality of cache slots is adjusted based on an access latency of the external memory.

4. The method of claim 1, wherein the predetermined threshold is based on at least one of a size of the first queue and an access latency of the external memory.

5. The method of claim 1, wherein the plurality of data packets are received from at least one of a downstream source and upstream source of the PON.

6. The method of claim 1, wherein the internal memory is a static random access memory (SRAM).

7. The method of claim 1, wherein the external memory is a double data rate (DDR) type of memory.

8. The method of claim 1, further comprising:
 sustaining a traffic transmission of non-buffered data traffic.

9. An optical network unit (ONU), comprising:
 a chip comprising a first memory, wherein the chip further comprises a receiver configured to receive a plurality of data packets from a stream of packets;
 a second memory external to the chip; and
 a packet microprocessor configured to:
  store a plurality of packet descriptors associated with each data packet in a configurable first queue in the first memory, wherein the first queue includes a plurality of cache slots;
  adjust a quantity of the plurality of cache slots based on read and write operations to the second memory;
  identify a state of the first queue; and
  in response to the state of the first queue meeting a predetermined threshold, transfer packet descriptors from a tail cache slot from among the plurality of cache slots of the first queue to a second queue in the second memory; and store additional packet descriptors in the second queue while the state of the first queue meets the predetermined threshold;

dequeue a packet descriptor from the first queue;

in response to the dequed packet descriptor, transfer content of a cache slot from among the plurality of cache slots from the second queue to the first queue, the content comprising at least one of the additional packet descriptors; and change the state of the first queue when all additional packet descriptors of the second queue are transferred to the first queue and all cache slots of the first queue are available for storage.

10. The ONU of claim 9, wherein the packet microprocessor is further configured to:

determine a size of the first queue, wherein the size is based on a number of cache slots available for storage;

determine whether all cache slots of the first queue include at least one packet descriptor; and when all cache slots of the first queue include at least one packet descriptor, change the state of the first queue.

11. The ONU of claim 10, wherein the quantity of the plurality of cache slots is adjusted based on an access latency of the second memory.

12. The ONU of claim 9, wherein the predetermined threshold is based on at least one of a size of the first queue and an access latency of the second memory.

13. The ONU of claim 9, wherein the plurality of data packets are received from at least one of a downstream source and an upstream source.

14. The ONU of claim 9, wherein the first memory is a static random access memory (SRAM).

15. The ONU of claim 9, wherein the second memory is a double data rate (DDR) type of memory.

16. The ONU of claim 15, wherein non-buffered data traffic is sustained.

17. A non-transitory computer program product having control logic stored therein, said control logic when executed causing a processor to perform operations for managing memory in a passive optical network (PON), the operations comprising:

receiving a plurality of data packets;

storing a plurality of packet descriptors associated with each data packet in a configurable first queue, wherein the first queue includes a plurality of cache slots and is managed in an internal memory;

adjusting a quantity of the plurality of cache slots based on read and write operations to an external memory;

identifying a state of the first queue;

in response to the state of the first queue meeting a predetermined threshold, transferring packet descriptors from a tail cache slot from among the plurality of cache slots of the first queue to a second queue, wherein the second queue is managed in the external memory; and storing additional packet descriptors in the second queue while the state of the first queue meets the predetermined threshold;

dequeueing a packet descriptor of the plurality of packet descriptors from the first queue;

in response to the dequeuing of the packet descriptor, transferring content of a cache slot from among the plurality of cache slots from the second queue to the first queue, the content comprising at least one of the additional packet descriptors; and changing the state of the first queue when all additional packet descriptors of the second queue are transferred to the first queue and all cache slots of the first queue are available for storage.

18. The non-transitory computer program product of claim 17, wherein identifying the state of the first queue comprises;

determining a size of the first queue, wherein the size is based on a number of cache slots available for storage;

determining whether all cache slots of the first queue include at least one packet descriptor; and when all cache slots of the first queue include at least one packet descriptor, changing the state of the first queue.

19. The non-transitory computer program product of claim 18, wherein the quantity of the plurality of cache slots is adjusted based on an access latency of the external memory.

20. The non-transitory computer program product of claim 17, wherein the predetermined threshold is based on at least one of a size of the first queue and an access latency of the external memory.

* * * * *